(12) United States Patent
Hirata (10) Patent No.: US 7,230,734 B2
(45) Date of Patent: Jun. 12, 2007

(54) TELEVISION BROADCAST RECEIVING APPARATUS, TELEVISION BROADCAST RECEIVING METHOD, AND TELEVISION BROADCAST RECEIVING PROGRAM

(75) Inventor: Takashi Hirata, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 1240 days.

(21) Appl. No.: 10/094,823

(22) Filed: Mar. 12, 2002

(65) Prior Publication Data
US 2002/0144295 A1    Oct. 3, 2002

(30) Foreign Application Priority Data
Mar. 22, 2001  (JP) ............... 2001-082865

(51) Int. Cl.
*G06F 3/12* (2006.01)
*G06F 15/00* (2006.01)
(52) U.S. Cl. .................. 358/1.15; 358/1.13
(58) Field of Classification Search ............ 358/1.15, 358/1.13, 1.14, 1.1, 407, 468; 348/14.04, 348/722; 725/153, 143
See application file for complete search history.

(56) References Cited
U.S. PATENT DOCUMENTS

| | | | |
|---|---|---|---|
| 6,532,591 B1 | 3/2003 | Arai et al. ........... | 725/132 |
| 6,652,174 B1* | 11/2003 | Mann et al. ........... | 400/691 |
| 6,690,481 B1* | 2/2004 | Yeung et al. .......... | 358/1.15 |

FOREIGN PATENT DOCUMENTS

| | | |
|---|---|---|
| JP | 11-296325 | 10/1999 |
| KR | 1988-85803 | 5/1998 |
| KR | 0278759 | 1/2001 |
| WO | 99/05603 | 4/1999 |

* cited by examiner

*Primary Examiner*—Dov Popovici
(74) *Attorney, Agent, or Firm*—Fitzpatrick, Cella, Harper & Scinto (57) ABSTRACT

In a system for receiving a television broadcast, when a printer is connected to a receiving apparatus for use, a printer driver which controls the printer is automatically registered. For this purpose, a television broadcast receiving apparatus includes a unit for setting download information for a printer driver to be retrieved, a unit for retrieving a printer driver file which is specified by the set download information with the television broadcast, and a unit for installing the printer driver file into a storage unit so as to be executable.

23 Claims, 11 Drawing Sheets

| REGISTRATION OF i. LINK DEVICE ||
|---|---|
| CONNECTED DEVICES ~902 | REGISTERED DEVICES ~903 |
| 01 D-VHS COMPANY A ABC<br>02 D-VHS COMPANY B DEF<br>03 Printer COMPANY C 850<br>04 Printer COMPANY D 760 | i. 1 D-VHS ABC<br>i. 2<br>i. 3 Printer 850<br>i. 4<br>i. 5<br>i. 6 |

FIG. 10

| | | DOWNLOAD GUIDE 1001 | | | |
|---|---|---|---|---|---|
| 1002 | 1003 | 1004 | 1005 | 1006 | 1007 |
| DEVICE | VENDER | MODEL | VERSION | TIME | CHANNEL |
| Printer | COMPANY C | 850 | v2.0 | 03:00~03:30 | ES |
| Printer | COMPANY C | 870 | v2.0 | 03:00~03:30 | ES |
| ⋮ | ⋮ | ⋮ | ⋮ | ⋮ | ⋮ |
| Printer | COMPANY D | 730 | v2.1 | 04:00~04:30 | ES |
| Printer | COMPANY D | 760 | v1.0 | 04:00~04:30 | ES |

FIG. 11

TELEVISION BROADCAST RECEIVING APPARATUS, TELEVISION BROADCAST RECEIVING METHOD, AND TELEVISION BROADCAST RECEIVING PROGRAM

BACKGROUND OF THE INVENTION

1. Field of the Invention

The present invention relates to a television broadcast receiving apparatus which receives television broadcasts, a television broadcast receiving method, and a control program for the television broadcast receiving apparatus. More particularly, the present invention relates to a method of retrieving a printer driver for a printer connected to a television broadcast receiving apparatus.

2. Description of the Related Art

In recent years, broadcasting services have become increasingly widespread, and television broadcasts (hereinafter referred to as "TV broadcasts") include satellite broadcasting systems using satellite radio waves, such as BS (Broadcasting Satellite) analog broadcasting, BS digital broadcasting, and CS (Communication Satellite: CS broadcasts are received using an antenna having less power than BS; in future, both BS and CS broadcasts will be able to be received using the same antenna) digital broadcasting; terrestrial broadcasting systems, such as terrestrial analog broadcasting and terrestrial digital broadcasting (digital television, or DTV) in the U.S. (in Japan, this service will start in 2003); and cable TV broadcasting systems via cable. As such, a multiplicity of broadcasting systems is used for TV broadcasts, in which, as analog TV broadcasting has been shifted to digital TV broadcasting, the number of multiplexed-data broadcasts has increased.

Although a multiplexed-data broadcasting system includes not only multiplexed audio data, as known in the art, but also various other types of multiplexed data, analog broadcasting services must use only a bandwidth as narrow as approximately 64 kbps, and thus broadcast a limited amount of data. On the other hand, data broadcasting services in the BS digital broadcasting system can use a wide bandwidth ranging from 1.5 Mbps to 2 Mbps, thereby providing multiplexed-data broadcasts with moving picture and audio data carried thereon, which has not previously been achieved. For example, a user is simply required to press a remote controller button during a program on the TV in order to view recipes on another screen or on a portion of the screen during a cooking program, or to view the cast in a drama.

In order to receive BS digital broadcasts, a user must have a BS tuner. Plug-and-play capability enables the BS tuner to recognize a device which is connected to a TV monitor or a video via an IEEE 1394 interface, called i.LINK (trademark of Sony Corporation), and to set the system configuration accordingly.

With the growth of data broadcasting, it may be contemplated in the future that when a data broadcast having multiplexed print content is delivered from a broadcast station, a user at the receiver side need only press a remote controller button during a TV program in order to perform an operation which allows the content to be printed from a user's printer. In this case, the printer should be connected to the BS tuner, but there is currently no BS tuner capable of interfacing with a printer.

On the other hand, there is a tuner (called a set-top box) for Web TV, etc., which can access the Internet to allow a user to browse Internet content. The set-top box for Web TV has a serial interface which can interface with a printer.

However, the set-top box has such a small memory area that only a simple printer driver can be installed, which can support only Web-TV-supported printers. Thus, there is a problem in that general printers for personal computers, which have become widespread recently as the popularity of personal computers has increased, cannot be used, and users who have purchased a PC printer must purchase a new Web TV printer, thus increasing the financial burden on the users.

In future, the system configuration may be contemplated such that a BS tuner or a set-top box provided with a large-capacity memory, such as a hard disk, in which a printer driver is stored to allow a user to use various kinds of printers. However, with the rapid advancement of software, if the same printer is used with the most up-to-date printer driver, the print quality or performance will increase. It is thus necessary to update the printer driver. On the other hand, manufacturers or sellers of BS tuners or set-top boxes also have a problem in that incorporating a printer driver which might not be used by all users within a tuner or a set-top box at the factory will disadvantageously complicate the production process and increase the production cost.

Furthermore, recently, as the number of companies which develop printers has increased, and the number of types of printers has increased, it is bothersome for a user to recognize the printer connected to a tuner or a set-top box and to prepare and install a printer driver which supports that printer. Installation of an incorrect printer driver may result in incorrect printing operation. Therefore, there is a need for providing a system which can be conveniently used by users.

SUMMARY OF THE INVENTION

Accordingly, the present invention has been made in view of the foregoing problems, and an object of the present invention is to provide a receiving apparatus comprising a tuner for receiving multiplexed television broadcasts which does not require a user's or viewer's time-consuming operation for initial setup or updating of a printer driver.

It is another object of the present invention to provide a system for receiving multiplexed television broadcasts which comprises a mechanism for receiving data regarding a printer driver which is transmitted with television broadcasts, and for automatically saving the printer driver in a memory for use so that the printer driver which controls a user-usable printer can be automatically updated.

It is still another object of the present invention to provide a system comprising a tuner for receiving multiplexed television broadcasts which has the ability to automatically recognize a printer connected to the tuner, to determine a printer driver which controls that printer, and to automatically download a printer driver which is transmitted with television broadcasts.

It is still another object of the present invention to provide a mechanism which determines the downloading time for a printer driver and which informs a user of that time to prevent the user from receiving another television broadcast during that time.

To this end, according to the present invention, a television broadcast receiving apparatus for receiving a television broadcast includes: a setup unit for setting download information for a printer driver to be retrieved; a retrieving unit for retrieving a printer driver file which is specified by the download information which is set by the setup unit; and an installation-executing unit for executing an installation operation to install the printer driver file retrieved by the retrieving unit into a storage unit so as to be executable.

The above-described objects are achieved by providing a television broadcast receiving method associated with the above-described apparatus, a control program which causes the television broadcast receiving apparatus to perform the above-described functions, and a storage medium having the control program stored therein.

Other features and advantages of the present invention will become apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the accompanying drawings.

Data Broadcasting System Configuration Diagram

Figure 1:
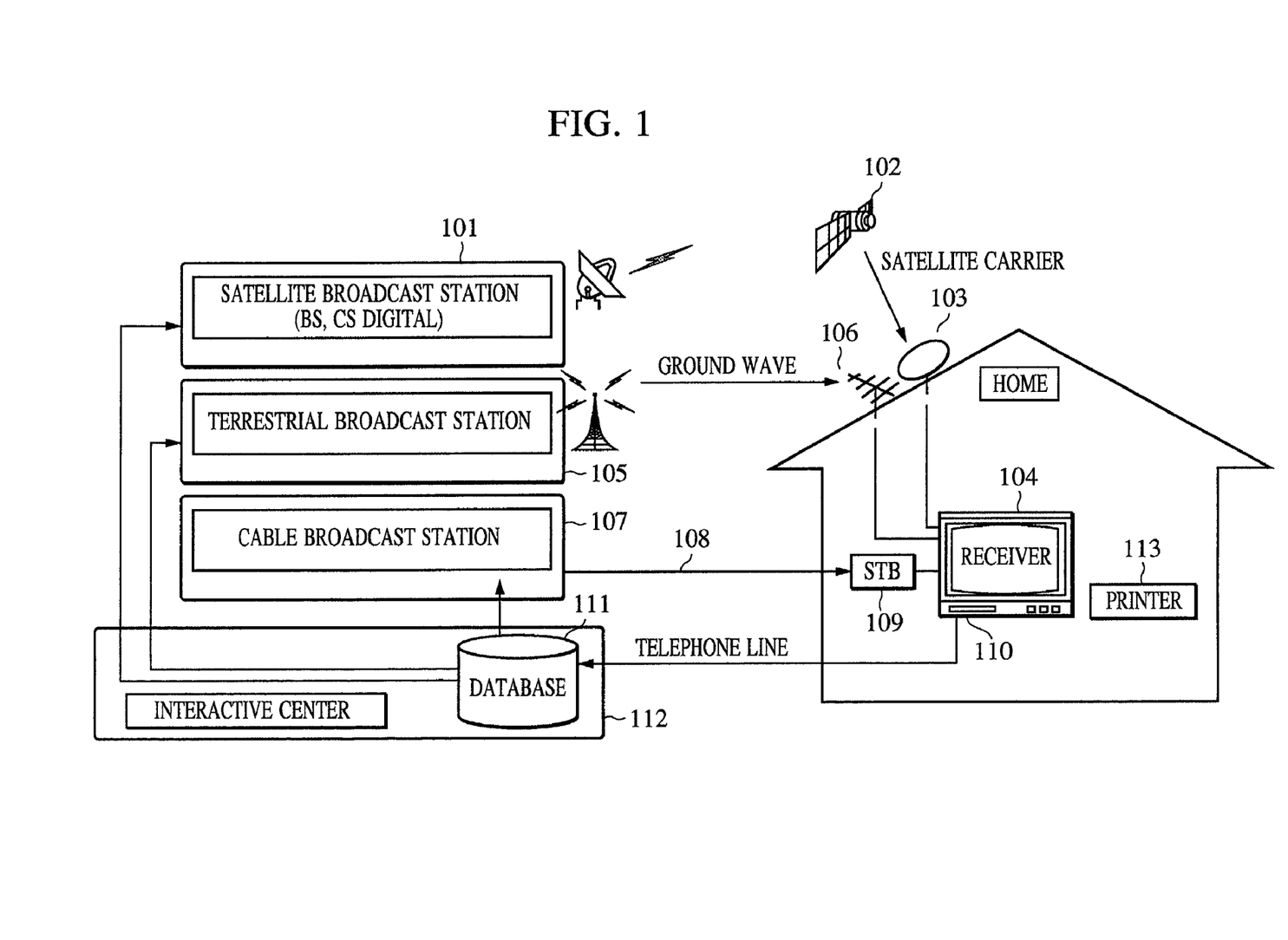
FIG. 1 is a system configuration diagram which illustrates a data broadcasting system according to the present invention.

FIG. 1 is a system configuration diagram which illustrates a data broadcasting system according to an embodiment of the present invention.

A satellite broadcast station 101 provides satellite broadcasts using satellite carrier waves via a communication satellite 102. The satellite broadcasting services include BS (Broadcasting Satellite) analog broadcasting, BS digital broadcasting, and CS (Communication Satellite: CS broadcasts are received using an antenna having less power than BS; in future, both BS and CS broadcasts will be able to be received using the same antenna) digital broadcasting. In a home, a television broadcast (hereinafter referred to as "TV broadcast") which is transmitted on a satellite carrier is received via a satellite antenna (there is a difference between a BS antenna and a CS antenna) 103 by a receiver 104 comprising a television broadcast receiving apparatus according to the present invention. The receiver 104 has an internal BS or CS tuner.

A terrestrial broadcast station 105 provides TV broadcasts over the air. While only analog terrestrial broadcasting services are presently provided in Japan, in addition to this, digital terrestrial broadcasting services are provided in the U.S. In the home, a TV broadcast transmitted over the air is received by the receiver 104 via a terrestrial antenna 106.

A cable television broadcast station 107 provides cable TV broadcasts via a cable 108. The cable TV broadcasting services can provide high image quality even for an area which does not fall within the range of terrestrial coverage or in which reception of radio waves is weak. In addition, as the number of cable television broadcast stations (cable head ends (CHEs), also called cable providers) which provide Internet connection services has recently increased, the number of subscribers has increased. In the home, a TV broadcast which is transmitted via the cable 108 is received by the receiver 104 via a cable-television set-top box 109. Since the set-top box 109 also functions as a tuner for cable television broadcasts, the receiver 104 may be a normal television set.

The receiver 104 further includes an internal modem 110 which can be used to access an interactive center 112 via a telephone line to upload various data to a database 111. For instance, in recent CS digital broadcasting or BS digital broadcasting, a so-called CAS (conditional access system) gives each subscriber controlled access to pay broadcasting services, and subscription contracts are made by two-way communication via the modem.

Furthermore, in the present embodiment, a printer 113 may be connected to the receiver 104, and the printer 113 can be used to print the print content contained in a data broadcast.

Hardware Configuration for Television Broadcast Receiving Apparatus

Figure 2:
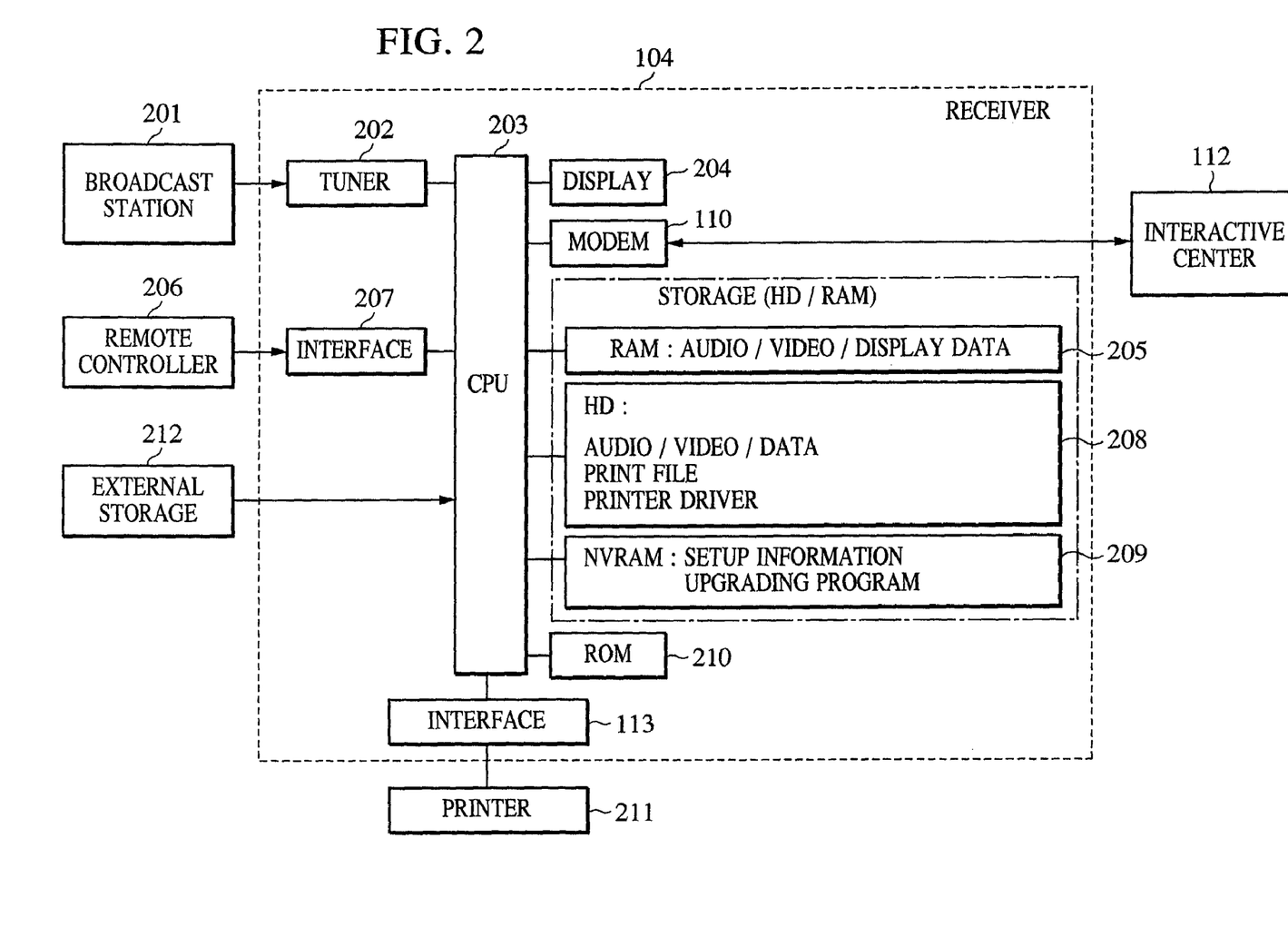
FIG. 2 is a block diagram which illustrates the hardware configuration of a television broadcast receiver according to the present invention.

FIG. 2 is a block diagram of the hardware configuration of the receiver 104 comprising the television broadcast receiving apparatus according to the present invention. In FIG. 2, the same reference numerals are assigned to the same parts as those in FIG. 1. The present embodiment will be described with reference to digital TV broadcasting, by way of example.

In FIG. 2, a TV broadcast transmitted from a broadcast station 201 (the satellite broadcast station 101 or the terrestrial broadcast station 105) is received by the receiver 104 via the antenna 103 (or 106). A tuner 202 demodulates and performs error correction on the received signal that is digitally modulated to generate a TS signal (transport stream data). Then, data packets for the channel which is selected by operation of a remote controller 206 are filtered and extracted from the TS signal in which various data, such as video or audio data, electronic programme guide (EPG) data, and data-broadcasting data, for a plurality of channels are multiplexed in a time-division manner, and program content is displayed on a display device 204.

The TS data is transmitted in packets, and a PID (packet identification) is placed at the head of each packet. The tuner 202 or a CPU 203 reads the PID to identify video or audio data encoded according to MPEG-2, data-broadcasting data, EPG data, and printer driver related data (described later). The EPG data is transmitted in a data format according to the standards specified by the Association of Radio Industries and Businesses (ARIB). The possible data formats include SDT (Service Description Table), which is used to transmit information about a channel, and EIT (Event Information Table), which is used to transmit information about a program, such as the program title, the day and time of the start of the broadcast, and a description of the program content. For data broadcasting, digital data is repeatedly sent from a broadcast station using the DSM-CC Data Carousels profile specified by ISO/IEC13818-6. The filtered data-broadcasting data contains text information, script information, image information, and video and audio data, which are described in BML (Broadcast Markup Language) which is an extension of XML for the purpose of broadcasting.

The CPU 203 causes the data for data broadcasting and EPGs to be retrieved and stored in the RAM 205.

When an instruction is entered from the remote controller 206 via an interface 207 to display data broadcasts, the CPU 203 causes the display BML data to be read from the RAM 205 to generate a video signal so as to be viewed using a simple browser, and causes the resulting video signal to be output to the display device 204.

The CPU 203 further causes the print content (print file) for data broadcasting, a downloaded printer driver, and the like to be stored in a large-capacity non-volatile memory 208 such as a hard disk, as described later. In response to a printing instruction using the remote controller 206, the CPU 203 causes the printer driver to be loaded into the RAM 205 and causes the print content to be read to generate print data using the printer driver for printing by the printer 113 via an IEEE 1394 interface 211. The interface 211 may be any interface which can interactively communicate with the printer 113, and is preferably an IEEE 1394 interface or a USB interface because of its high communication rate.

An NVRAM (non-volatile random-access memory) 209 stores various settings for a BS tuner, and an upgrading program. A ROM (read-only memory) 210 stores various control programs for the BS tuner.

The display device 204 is not necessarily contained in the receiver 104, and may be externally connected via an IEEE 1394 interface. In this case, the receiver 104 functions as a BS digital tuner apparatus which uses Plug-and-Play of i.LINK to determine the type of the display unit 204 that interfaces with the receiver 104, and to configure a display program which is stored in the NVRAM 209. If the display unit 204 is built-in, the receiver 104 serves as a BS digital high-definition TV. The large-capacity memory 208 may not be contained in the receiver 104, but may be an external storage 212 which is connected to the receiver 104.

The CPU 203 has the ability to execute a program to control the tuner 202 (which performs the tuning process, the descrambling process, the demultiplexing process, and the decoding process), and a screen creation unit (not shown) for creating information which is output as a video signal) according to the operation of the remote controller 206 which has various operational switches for channel selection, turning on/off, etc.

Remote Controller

Figure 3:
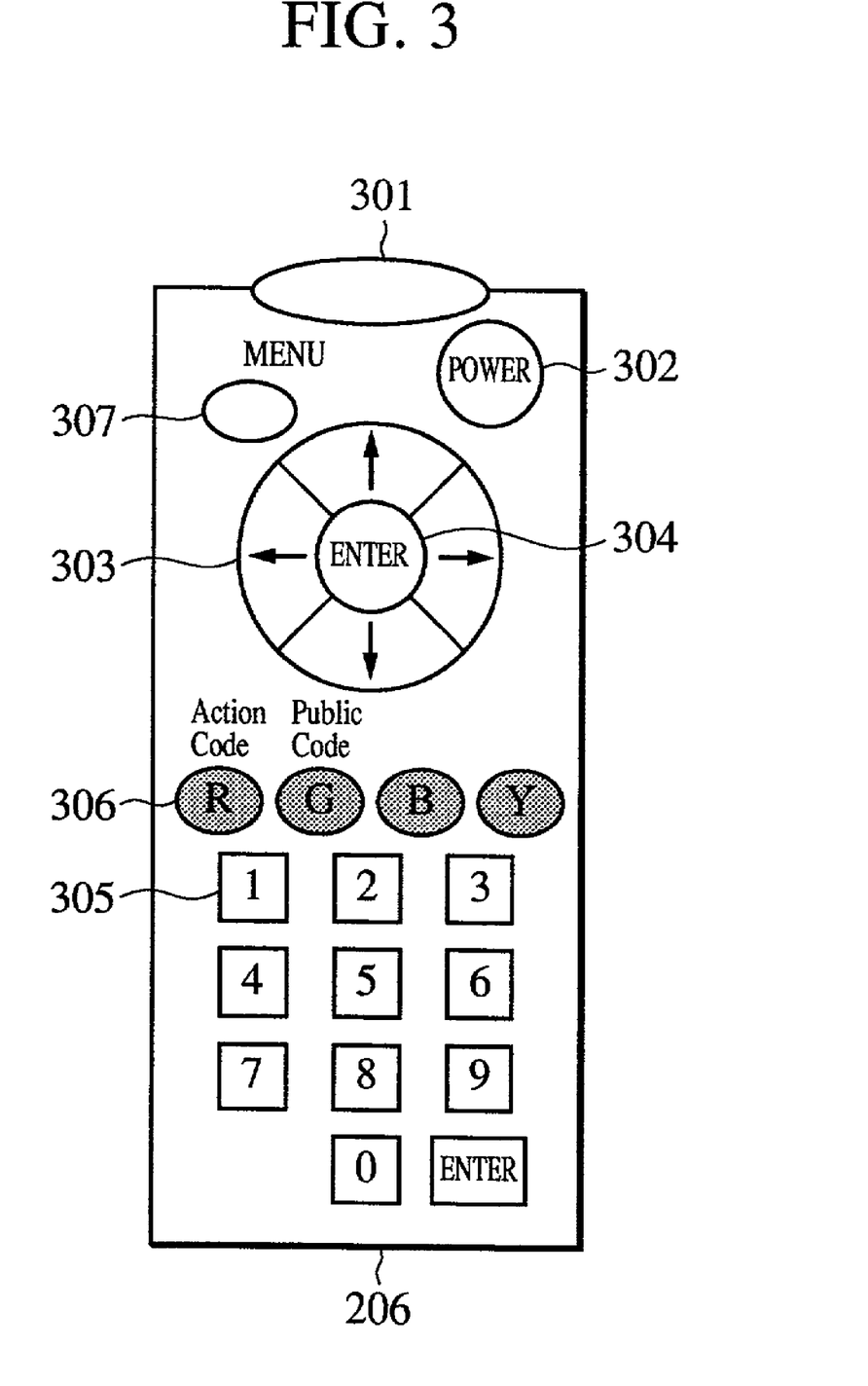
FIG. 3 is a diagram of a remote controller which remotely controls the television broadcast receiver according to the present invention.

An example of the remote controller 206 is illustrated in FIG. 3. FIG. 3 shows only those operation buttons so that the functions required to describe the present embodiment are achieved, and the buttons required for an actual receiver are not limited to only these buttons.

In FIG. 3, a light emitting unit 301 is used for IRDA (infrared data association) communication between the remote controller 206 and the interface 207 corresponding to a light receiving unit shown in FIG. 2. A power button 302 is used to turn on/off the television broadcast receiving apparatus 104. In the present embodiment, when the power button 302 is operated by a user, the main power supply of the display unit 204 is turned off, while the receiver 104 itself goes into standby and is not completely turned off, thereby continuing to receive TV broadcasts from the broadcast station 201.

A cursor key 303 is used to move a selection cursor up, down, right, and left. An enter button 304 is used to enter the selection of the area pointed to by the selection cursor. A menu button 307 is used to show a menu screen. A so-called color key 306 includes a set of four buttons of red, green, blue, and yellow, which are placed in the stated order from the left edge. "Action Code" is imprinted beside the red key, and "Public Code" is imprinted beside the green key. A ten-key 305 is used to enter a channel number or any numerical value.

Functional Block Diagram of Broadcast Station

Figure 4:
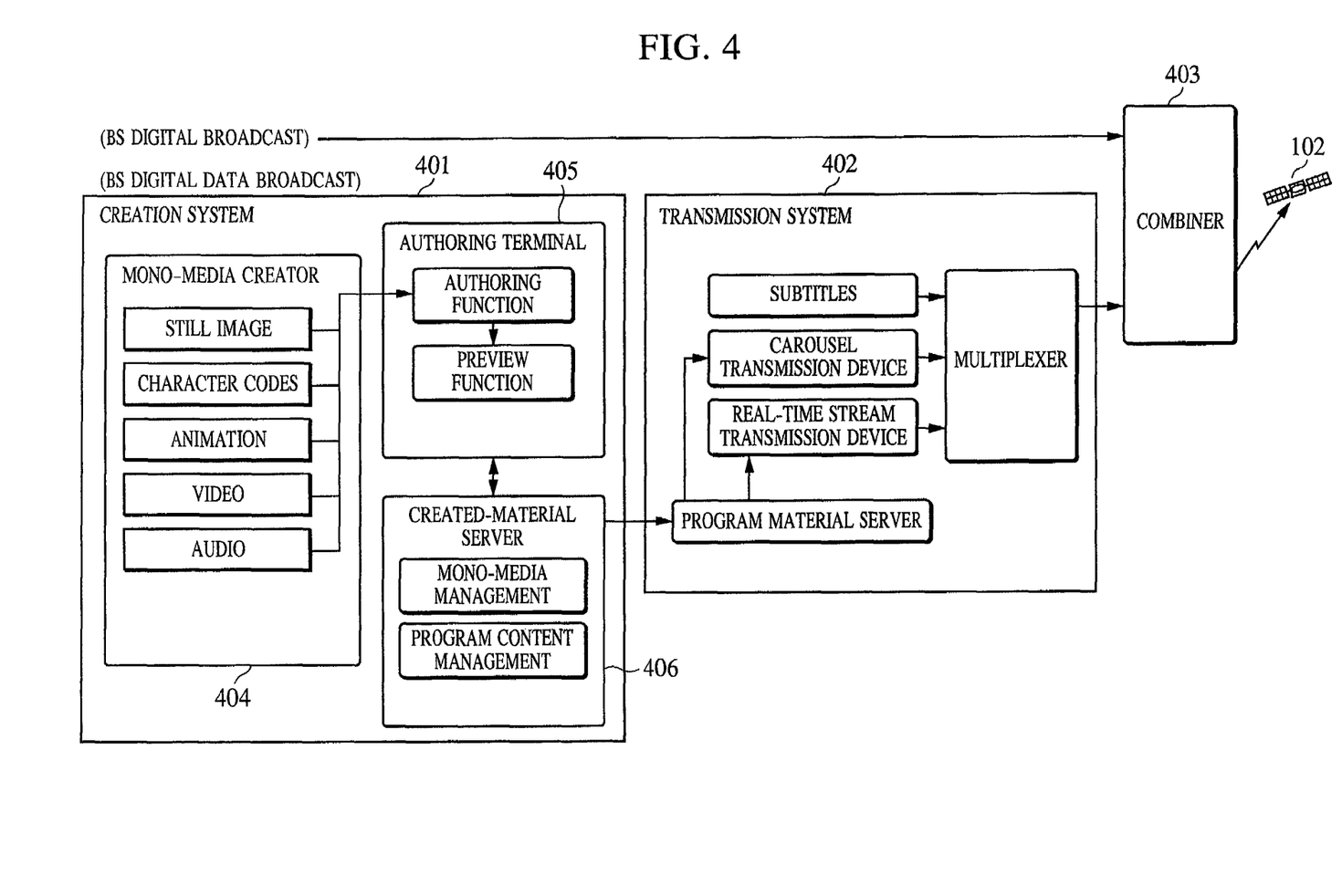
FIG. 4 is a system configuration diagram which illustrates a system in a broadcast station for BS digital broadcasts which is implemented in an embodiment of the present invention.

FIG. 4 is a block diagram which illustrates the functions of the broadcast station 201 (which may be a terrestrial or satellite broadcast station, as long as it is a data-broadcasting broadcast station) including a television broadcast transmission apparatus. In FIG. 4, the same reference numerals are assigned to the same parts as those in FIGS. 1 to 3. The present embodiment will be described with reference to BS digital broadcasting, by way of example.

In FIG. 4, a creation system 401 creates data broadcasts, including a mono-medium creation function for creating mono-medium materials, such video, audio, and still images, for use in a program, an authoring function for creating a program using a combination of the created mono-medium materials, a preview function for checking the created program, and a created-material server for managing the created program and material data.

The program created by the creation system 401 is passed to a transmission system 402, and is then broadcasted via a satellite at broadcast time. In the transmission system 402, the data broadcasts, except for stream-based data, are delivered according to so-called carousel transmission, as described in detail below, by which the same content is sent in a looped manner. The stream-based data such as moving picture and audio is delivered according to real-time stream transmission. In the delivery system, data transmitted from a superimposition transmission device for transmitting emergency information on earthquakes, tidal waves, and the like, a carousel transmission device, and a stream transmission device are multiplexed by a multiplexer. The resulting data is combined by a combiner 403 with a digital broadcast on a regular program which is not a data broadcast. The resulting TV broadcast is transmitted to homes via the satellite 102.

Example Programs in Data-Link Broadcast

Figure 5:
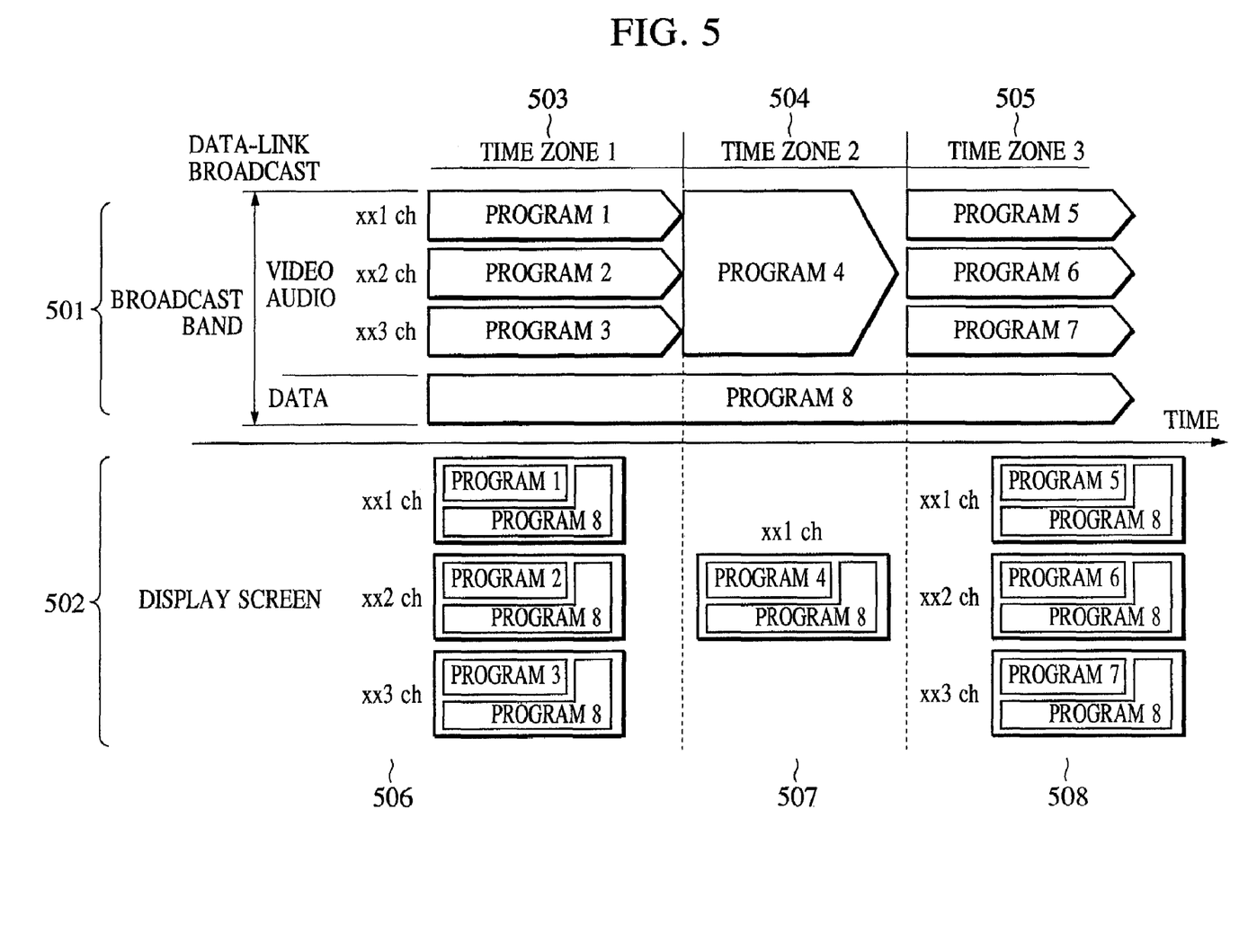
FIG. 5 is a broadcasting diagram which illustrates the data content of a multiplexed television broadcast which is implemented in an embodiment of the present invention.

FIG. 5 shows an example program construction in a data-link broadcast.

In FIG. 5, broadcast data 501 is broadcast data in program content which is transmitted from a broadcast station, and an image 502 of programs is displayed on the display device 204 in a home. In the broadcast station 201 (or the satellite broadcast station 101), a plurality of program contents are separately contained in a broadcast band. The broadcast band is assigned so that one video program and one data broadcasting section can be transmitted in an HD (high definition) broadcast (720p, or effective pixels of 1280×720 in progressive scanning mode; or effective pixels of 1080i, or 1920×1080 in interlaced scanning mode), and three video program channels and one data broadcast section can be transmitted in an SD (standard definition) broadcast (480p, or effective pixels of 720×480 in progressive scanning mode; or 480i, or effective pixels of 720×480 in interlaced scanning mode).

In the time zone 503, an SD broadcast is provided, in which SD programs 1 to 3 are transmitted as video broadcasts, while a data-broadcasting program 8 is also transmitted. The data-broadcasting program 8 is a data-broadcasting program synchronized with the programs 1 to 3. The program 8 may be changed to a different data-broadcasting program at the same time with termination of the programs 1 to 3, or may not be changed and be continuously broadcast. That is, the program 8 is an independent program. As indicated by a portion 506, the program 8 is displayed as discrete programs in channels xx1 to xx3 in the display device 204 in the home.

In time zone 504, an HD broadcast is provided, in which an HD program 4 is transmitted as a video broadcast in a single channel, while the data-broadcasting program 8 is concurrently transmitted. As indicated by a portion 507, the programs 4 and 8 are displayed as an HD broadcast in the representative channel xx1 on the display device 204 in the home.

One program broadcast is a data-link broadcast. Specifically, a video broadcasting program (content) is linked to a data broadcasting program (content), so that a broadcasting service can be provided in a manner synchronous with the main program. For instance, a drama may be broadcasted as a video broadcasting program, while a TV shopping program may be broadcasted as a data broadcasting program linked thereto, in which accessories or clothes which the heroine wears during the drama are explained. A viewer can immediately place an order on these items while viewing the drama. To place an order, a user operates the remote controller 206 to access the database 111 in the interactive center 112 via the modem 110. In the case of an SD broadcast in which programs are broadcasted in a plurality of channels, for example, a live baseball game may be broadcast from different viewpoints to allow a viewer (user) to view the desired video on the display device 204, including a video from around the center, a video from behind the catcher, and a video from the dugouts. The record of a particular player can also be shown in a data-link broadcast, or a viewer participation program for some voting may be broadcast by two-way communication.

Settings by Viewer

Figure 8:
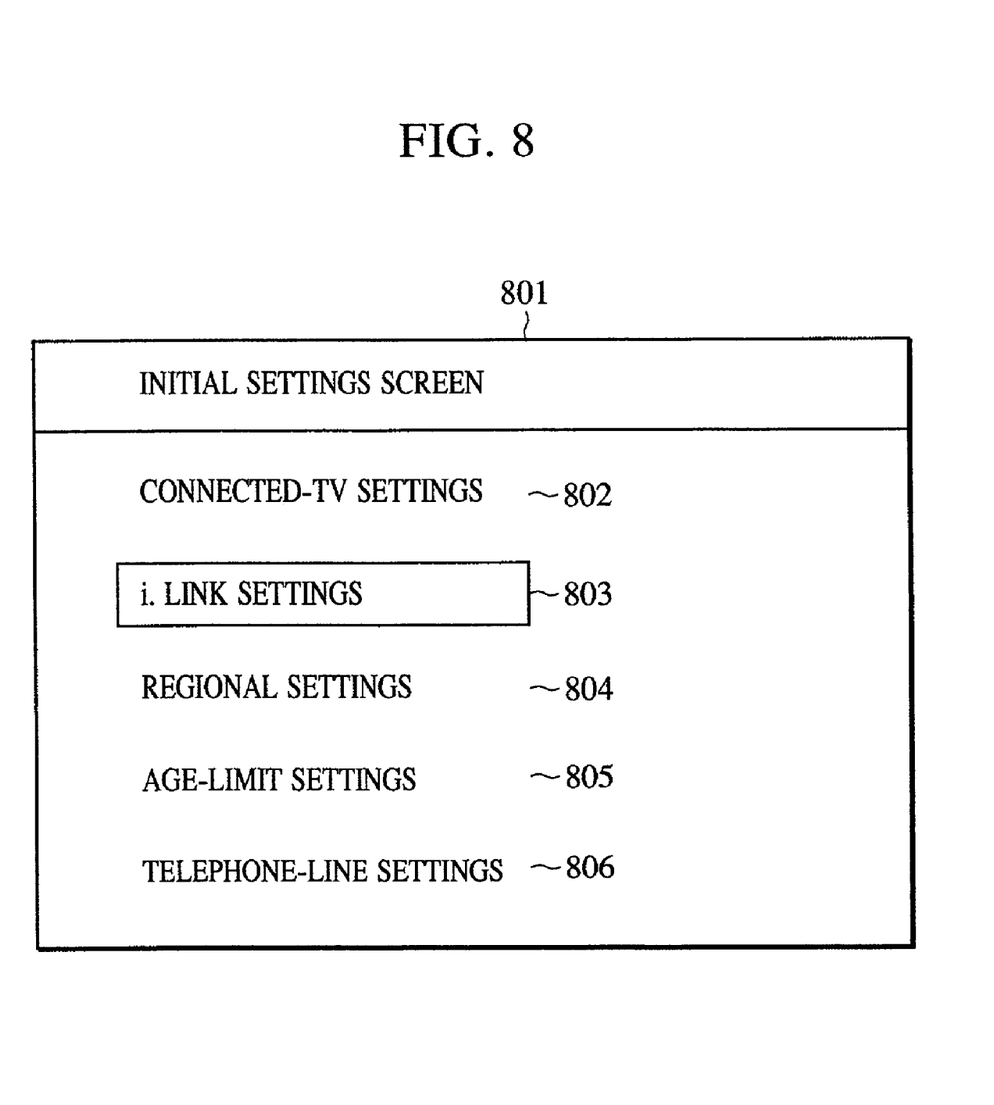
FIG. 8 is a conceptual view which illustrates a user interface on an initial settings screen which is displayed on a display device by the television broadcast receiver according to the present invention.

If a viewer turns on the receiver 104 (a BS digital tuner or a TV set having a built-in BS digital tuner in the present embodiment) which is connected with a printer via the (IEEE 1394 or USB) interface 211, an initial settings screen, as shown in FIG. 8, is displayed on the display device 204.

FIG. 8 is a conceptual view of an initial settings screen 801 displayed on the display device 204 by the television broadcast receiving apparatus 104 according to the present invention. The initial settings screen 801 includes settings items 802 to 806. The connected-television settings item 802 is to set the type (such as HD or SD) of the display device 204 connected to the receiver 104. If the receiver 104 which is a data broadcast receiving apparatus contains the display device 204, this item is not required. The i.LINK settings item 803 is settings for identifying and registering an external unit which is connected to the receiver 104 via an interactive interface (i.LINK is the specification for IEEE 1394 units). Although the present embodiment is described with respect to i.LINK, if devices are connected using another interactive interface such as a USB interface, the devices may be identified and registered according to a different specification from i.LINK. The regional settings item 804 is to set a graphical region where a viewer having the receiver 104 is resident. The age-limit settings item 805 is to set the viewer's age so that the viewer cannot receive an inappropriate program (for that viewer's age). The telephone-line settings item 806 is settings for accessing the interactive center 112 via the modem 110 to participate in a viewer participation program or to pay the charge of CAS (conditional access system). If a viewer points to the i.LINK settings 803 (also called peripheral device settings) on the initial settings screen 801, a peripheral device registration screen, as shown in FIG. 9, is displayed on the display device 204 by the television broadcast receiver 104.

Figure 9:
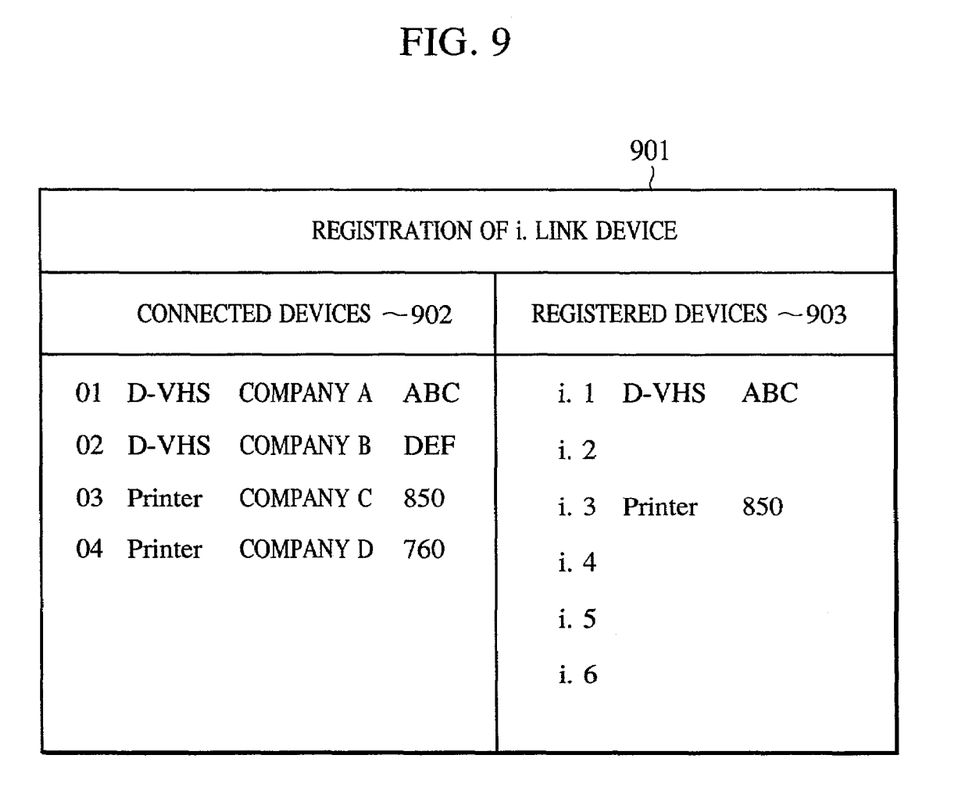
FIG. 9 is a conceptual view which illustrates a user interface on a peripheral registration screen which is displayed on the display device by the television broadcast receiver according to the present invention.

FIG. 9 shows an i.LINK device registration screen (also called peripheral device settings screen) 901 which is displayed on the display device 204. The peripheral device registration screen 901 includes field 902 indicating information about the types of peripheral devices connected via the interactive interface 211. The CPU 203 of the receiver 104 communicates with a peripheral devices (such as a printer 113, or a video device) via the interactive interface 211, and searches a list of devices that are managed by the NVRAM 209 on the basis of device ID information retrieved from the peripheral device to determine the type of the peripheral device. As described below, the list-of-device information contained in the multiplexed broadcast data from a broadcast station is separated and stored in the NVRAM 209 to update the list of devices. Thus, the list can support a new peripheral device. The peripheral device registration screen 901 further includes field 903 for specifying a device to be registered in the receiver 104 for use from the devices determined in field 902. In FIG. 9, a video device labeled "D-VHS ABC" and a printer labeled "Printer 850" are registered.

Device Recognizing Process and Download Process

A reference is hereinbelow made to the process for recognizing a printer and the process for automatically downloading a printer driver in the television broadcast receiving apparatus according to the present invention.

As described above, a printer can be connected via an interactive interface to the receiver 104 comprising the television broadcast receiving apparatus according to the present invention. Only a video, as usual, would be provided only for digital output, and would not require a special program at a receiver side. If, in future, a viewer will desire to print a data broadcast synchronized with a program, print data which allows for printout by a connected printer should be generated by the receiver 104. However, the format of print data differs from one printer vender to another, and further depending upon the settings from one printer type to another, and printer drivers differ from one printer to another. In order to overcome such an inconvenience, all types of printer drivers may be prepared, but this is inefficient, and is unrealistic in view of the frequent emergence of new printer types. Accordingly, the present invention provides a technique of installing a printer driver which supports a registered printer without the time and labor of a user (viewer).

Figure 6:
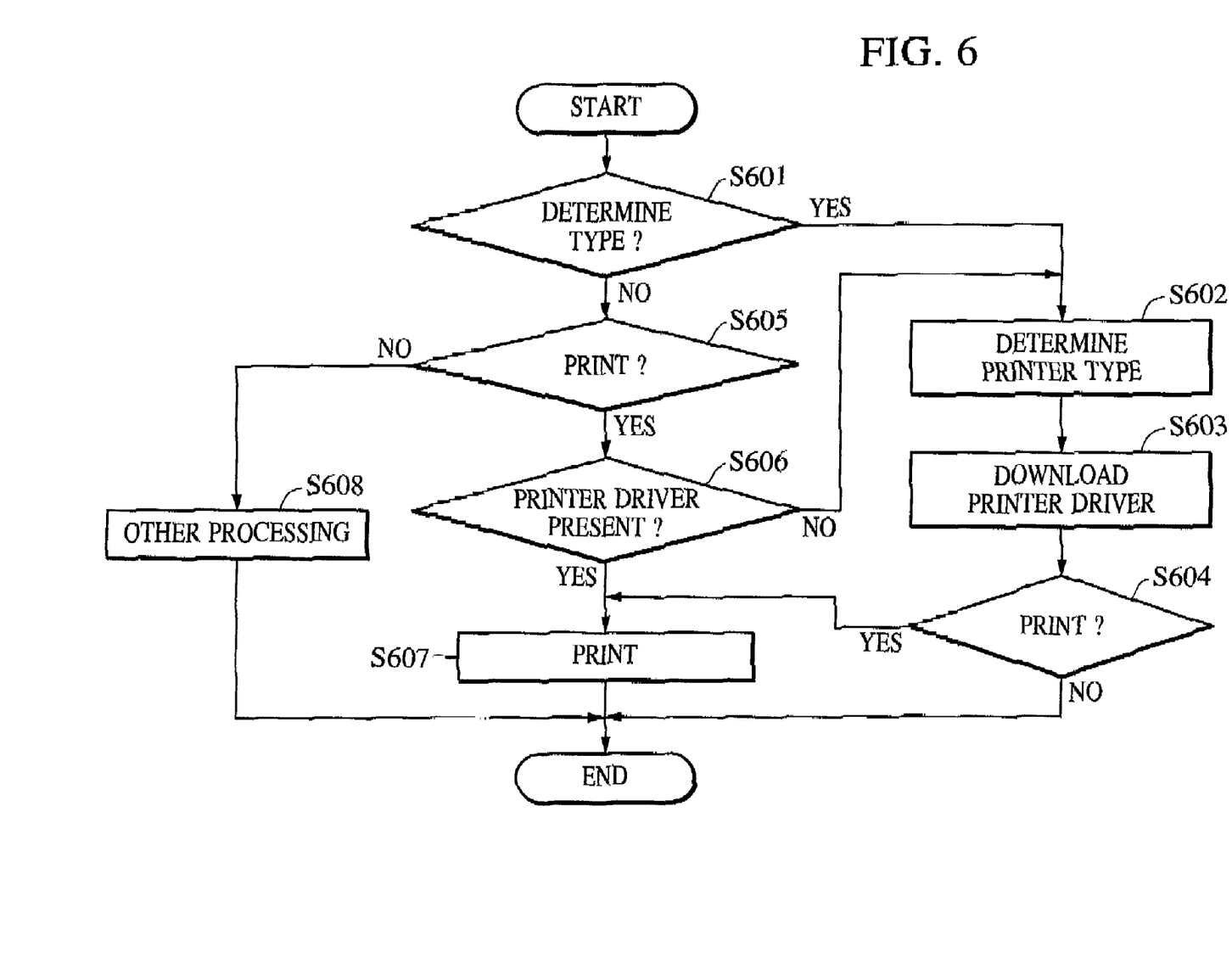
FIG. 6 is a flowchart which illustrates a control flow of the television broadcast receiver which is operated according to a control program of the present invention.

FIG. 6 shows the control process in the television broadcast receiving apparatus according to the present invention. The process is executed by a control of the CPU 203 according to a control program stored in the ROM 210 or the NVRAM 209.

In step S601, the CPU 203 of the receiver 104 determines whether or not an instruction has been made to determine the device type. As previously described, this is implemented by determining whether or not iLINK settings 803 have been established on the initial settings screen 801 shown in FIG. 8. If it is determined that an instruction has been made to determine the device type, then the process proceeds to step S602. If it is determined that an instruction has not been made to determine the device type, then the process proceeds to step S605.

In step S602, as previously described, the CPU 203 communicates with a peripheral device via the interactive interface 211, and searches a list of devices that are managed by the NVRAM 209 on the basis of device ID information retrieved from the peripheral device to determine information about the peripheral device type. Once the printer type has been determined, in step S603, the printer driver supporting the printer type is downloaded. This download process is described later in detail.

After the download process has completed, the normal screen is shown again, and it is determined in step S604 whether or not a viewer instructs to print a data broadcast synchronized with a program. If it is determined that the instruction has been made, the process proceeds to step S607, where the CPU 203 causes the printer driver stored in the HD 208 read on the RAM 205 to generate print data according to the printer driver program, and causes the print data to be transmitted to the printer 113 via the interactive interface 211. The printer 113 prints out the print data received via the interactive interface 211. If it is determined that the instruction has not been made, the process ends.

If it is determined in step S601 that an instruction has not been made to determine the device type, in step S605, the CPU 203 determines whether or not printing has been instructed. If it is determined that printing has been instructed, the process proceeds to step S606. If it is determined that printing has not been instructed, the process proceeds to step S608, where a specified process is performed, as appropriate, in step S608, and then the process ends.

If it is determined in step S605 that printing has been instructed, in step S606, the CPU 203 determines whether or not the printer driver which supports the printer registered by a viewer on the peripheral device registration screen shown in FIG. 9 is present in the HD 208. If the printer driver has been found, the process proceeds to step S607. If the printer driver is not present, the process returns to step S602, where the printer type is determined.

If it is determined in step S606 that the printer driver is present, the CPU 203 causes this printer driver to be read on the RAM 205 from the HD 208 to generate print data by converting a print file which is passed as print data in a data broadcast synchronized with a program according to the printer driver program, and causes the print data to be transmitted via the interactive interface 211. Then, the process ends. The printer 113 which has received the print data executes the printing operation.

The printing may include, for example, printing of recipes during a cooking program, printing of brochures during a travel program, and printing of pictures of the cast in a drama, as examples of digital television broadcast programs. During a program for the purpose of printing, magazine paper articles which are printed and delivered may be contemplated.

Figure 7:
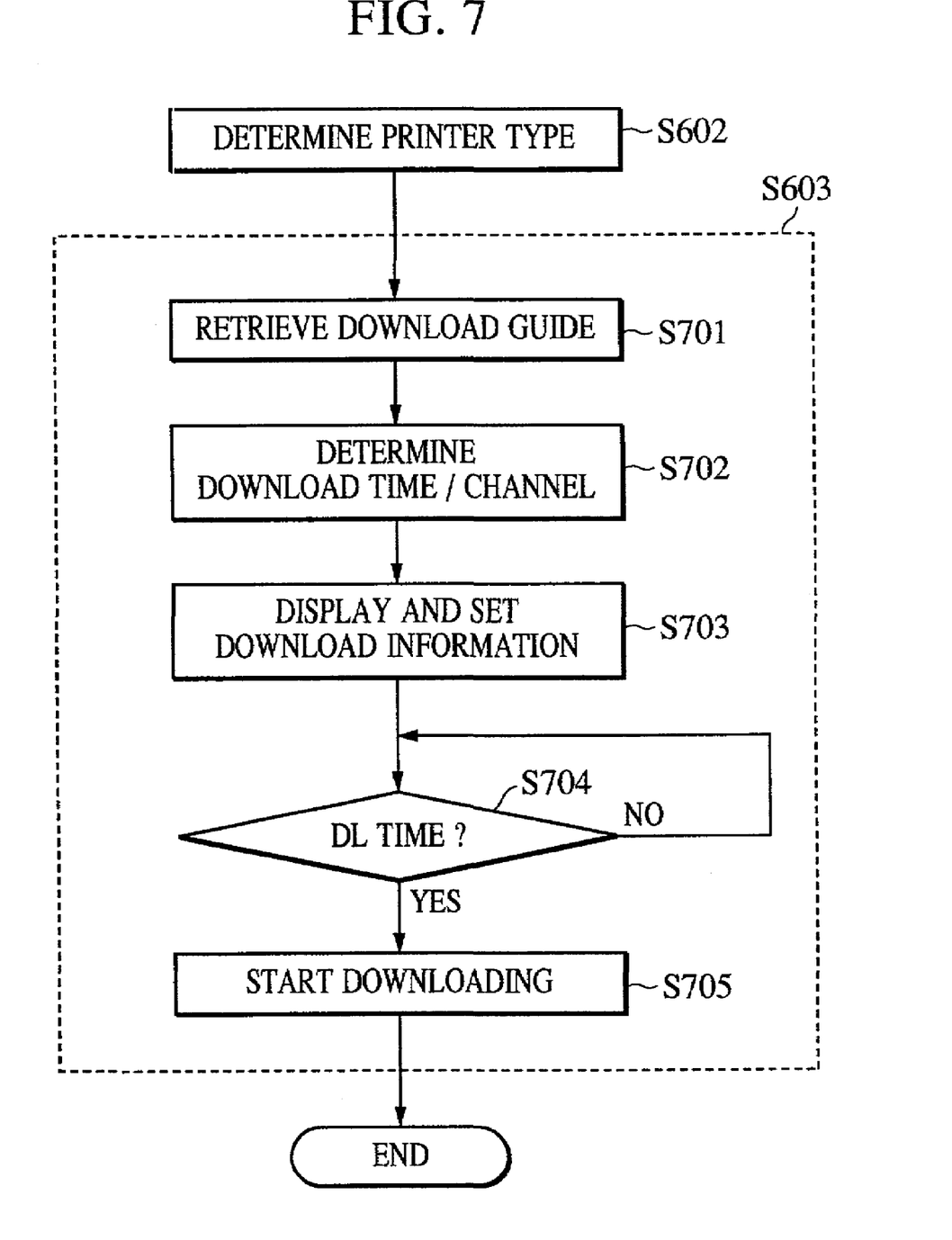
FIG. 7 is a flowchart which illustrates a detailed control flow of the download process for the television broadcast receiver which is operated according to the control program of the present invention.

The download process executed in step S603 in FIG. 6 is now described with reference to FIG. 7. This process is also a control process performed in the television broadcast receiving apparatus according to the present invention, and is implemented by a control of the CPU 203 according to a control program stored in the ROM 210 or the NVRAM 209.

In step S701, the CPU 203 retrieves download guide information by causing the tuner 202 to demultiplex the multiplexed-data broadcast, and store it in the HD 208. The download guide information is received at regular intervals from a common data broadcast channel, called ES (engineering slot), and is stored in the HD 208, like the electronic programme guide (EPG) data. Although the download guide information is handled as data different from EPG data in the present embodiment, the download guide information may be contained in EPG data. An example of the download guide information is shown in FIG. 10.

Figure 10:
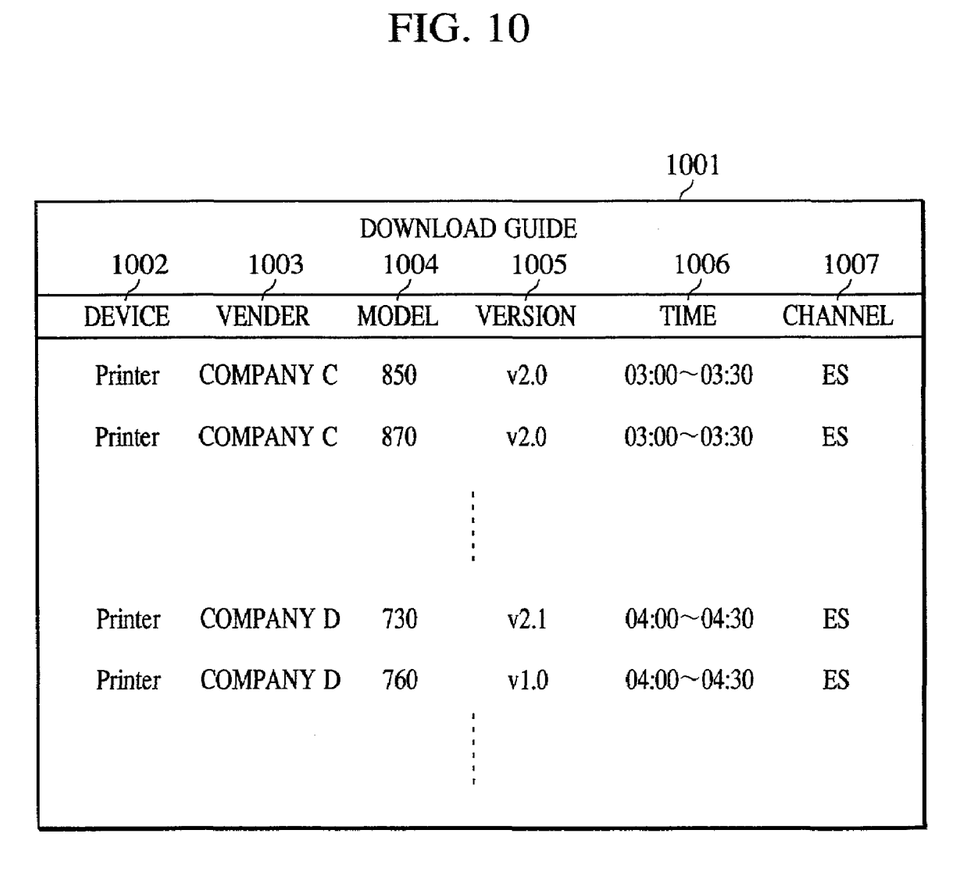
FIG. 10 is a conceptual view which illustrates a user interface on a display screen for a download guide which is displayed on the display device by the television broadcast receiver according to the present invention.

FIG. 10 is a conceptual view of a download guide display screen 1001 which is displayed on the display device 204 by the television broadcast receiving apparatus 104. On the download guide display screen 1001, a device type field 1002 contains a device type such as "printer." A device which requires a device driver, including, possibly, a scanner or a digital camera which will be able to be connected in future, may be contained in the device type field 1002. A vender name field 1003 contains the name of vender which manufactures the device. A model name field 1004 contains the model name, and a version field 1005 contains the version number of the printer driver which supports that model. This version information can be used to determine whether or not the printer driver should be updated. A time field 1006 contains the download time. In the control process according to the present invention, the printer driver is downloaded by transmitting a printer driver file as a part of the data broadcast. Unlike the relationship between a personal computer and a server in a typical networking environment, the printer driver cannot be actively downloaded from a client, and the time at which a server originates a program is pre-determined. In view of the data transfer rate, it only takes several seconds to several tens of seconds to download a printer driver completely, thereby allowing a plurality of different kinds of printer driver files to be transmitted many times from a broadcast station by means of carousel transmission in a certain time zone. In this example, printer drivers for both printers "Printer 850" and "Printer 870" are downloaded in the period of time from 03:00 to 03:30. Even if the download operation is not ready just at 3:00 a.m., the download operation will be complete within some tens of seconds if the download operation is ready at that timing, so that the printer drivers can be downloaded by carousel transmission. A channel field 1007 contains a channel in which the printer driver to be downloaded is broadcasted, and preferably contains a common data broadcast channel (hereinafter referred to as "commonly used channel"), called ES (engineering slot) shown in FIG. 10, because the engineering slot which is a commonly used channel is a channel in which data can be received even if the receiver 104 is in standby mode, that is, the receiver 104 is apparently turned off, without necessity for a viewer to particularly select a correct channel. However, the channel in which a download broadcast of a printer driver takes place is not limited to ES, and a download broadcast may take place as a portion of a usual data broadcast. In this case, there is a need for informing a viewer of the download broadcast in advance in order for the viewer to select that channel so as to receive the data broadcast of that channel at that time zone.

In step S702, with reference to the download guide information retrieved in step S701, the CPU 203 determines the download time and channel for the printer driver which supports the printer model determined in step S602. In the present embodiment, the printer model is "Printer 850" manufactured by company C, and it is determined that the download time is "03:00 to 03:30" and the channel is "ES (engineering slot, or commonly used channel)."

In step S703, in order to inform a viewer of the download time, the channel, the name of printer driver, etc., which are determined in S702, the CPU 203 causes the download information (containing the time, the channel, and the name of printer driver) to be generated and displayed on the display device 204. The CPU 203 also causes the download information to be registered in the NVRAM 209 (or the HD 208), and causes the printer driver to be downloaded on the registered channel at the registered time.

In step S704, the CPU 203 determines whether or not it is the download time which is set in step S703 by comparing the time of a timer (not shown) with the download time. If it is determined that it is not the download time, it loops back. If it is determined that it is the download time, the process proceeds to step S705.

In step S705, the CPU 203 retrieves a printer driver file by causing the tuner 202 to demultiplex the multiplexed-data broadcast, and registers the printer driver file in the HD 208. The registered printer driver file is in the executable format (the EXE format, such as "setup.exe"). Once the download operation has been completed, the CPU 203 executes the printer driver file in the executable format to install the printer driver.

If the channel in which the printer driver is downloaded is a commonly used channel (engineering slot), the channel need not be selected in particular in order to receive the printer driver. If the channel in which the printer driver is downloaded is not a commonly used channel, a viewer must select a correct channel in advance, and an alarm indicating that another television broadcast must not (and cannot) be received at that time is given to the viewer when the download information is displayed in step S703. In step S705, a printer driver is downloaded and installed, after which the receiver is returned to previous mode and the process proceeds to step S604, or, otherwise, the process ends. Specifically, printer drivers may often be downloaded at midnight during which the receiver will be in standby mode. When a printer driver is downloaded, therefore, the receiver is shifted from standby mode to power-on mode; then, once download operation has been completed, the receiver is returned to standby mode.

Figure 11:
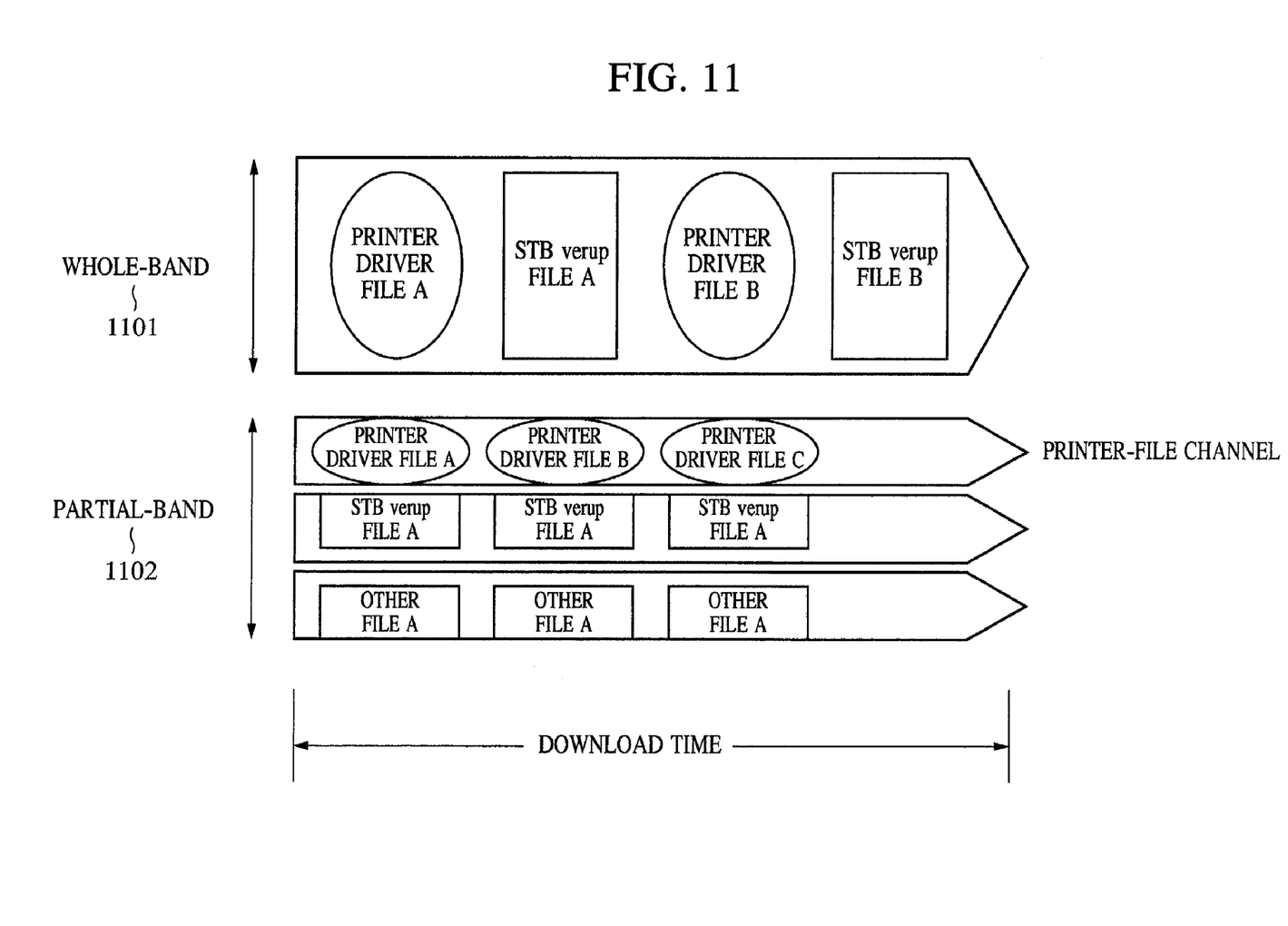
FIG. 11 is a broadcasting diagram which illustrates the broadcasting system for a printer driver file which is used in an embodiment of the present invention.

FIG. 11 shows the broadcasting method for a printer driver file. In FIG. 11, in order to broadcast a printer driver file which is multiplexed as a television broadcast at download time, the printer driver file is transmitted as an engineering stream. In FIG. 11, in a whole-band broadcasting method 1101, a file to be transmitted is divided and broadcasted at predetermined intervals in the whole band of a predetermined channel according to the carousel broadcasting protocol. In the whole-band broadcasting in FIG. 11, a printer driver file and a set-top box updating file are alternately transmitted, by way of example. In a partial-band broadcasting method 1102, the band of a predetermined channel is divided into a plurality of sub-bands in which different files are multiplexed and broadcasted simultaneously. In the partial-band broadcasting in FIG. 11, a printer driver file and a set-top box upgrading file (or any other file) are multiplexed and broadcasted, by way of example. It does not matter whether the whole-band or partial-band method is used. If it is not necessary to retrieve a set-top box upgrading file when a printer driver is downloaded, the receiver 104 downloads only the printer driver file, and stores it in the HD 208.

Accordingly, in the present embodiment, a receiving apparatus comprising a tuner for receiving a multiplexed television broadcast receives data regarding a printer driver which is transmitted with television broadcasts, and automatically saves the printer driver in a memory for use so that the printer driver which controls a user usable printer can be automatically updated.

Furthermore, a printer connected to a receiving apparatus including a tuner is automatically recognized, and a printer driver which controls that printer is determined to automatically download the printer driver which is transmitted with television broadcasts, thereby allowing a viewer or a user to correctly download the printer driver without determination of the printer type.

Furthermore, a receiving apparatus including a tuner determines the download time for a printer driver, and informs a user of that time to prevent the user from receiving another television broadcast during that time.

The present invention which has been described with respect to the illustrated embodiment is embodied as an apparatus comprising a single device (the receiver 104 including the display device 204); however, the present invention may be embodied as a system comprising a plurality of devices (for example, the display device 204 and the receiver 104 may be discrete, and the receiver 104 may be externally connected to a printer). If the present invention is embodied as the system, the system includes all of the processes described above.

The objects of the present invention may also be achieved by providing a storage medium which stores program code of software which implements the functions of the foregoing embodiment, and by causing a computer of a system or an apparatus (or a CPU or an MPU) to read and execute the program code stored in the storage medium. In this case, the program code read from the storage medium implements the functions of the foregoing embodiment, and the storage medium which stores the program code will be a constituent of the present invention.

Storage media for supplying the program code may include a floppy disk, a hard disk, an optical disk, a magneto-optical disk, a CD-ROM, a CD-R, a magnetic tape, a non-volatile memory card, a ROM, and a DVD.

The present invention may encompass not only the case where the functions of the foregoing embodiment are implemented by executing the program code which is read by the computer, but also the case where the functions of the foregoing embodiment are implemented by causing the OS (operating system) running on the computer to execute some or all of the actual processing according to the program code.

The present invention may further encompass the case where the functions of the foregoing embodiment are implemented by, after the program code read from the storage medium is written in a memory included in a function extension board inserted in a computer or a function extension unit connected to a computer, causing a CPU included in the function extension board or the function extension unit to execute some or all of the actual processing according to the program code.

In order to cause the functional process of the present invention to be implemented on a computer, program code which is installed in the computer may also implement the present invention. That is, the claimed invention may further encompass a computer program which implements the functional process of the present invention.

A supply method for the computer program is not limited to the method including storing the computer program in an FD or a CD-ROM, causing a computer to read it, and installing it in the computer, as previously described. The computer program may also be supplied by causing the receiver 104 to access a home page on the Internet via the modem 110, and by downloading, from the home page, the computer program of the present invention, or a file comprising a compressed version of the program having auto-installation capability. The supply of the computer program may also be implemented by dividing program code for the program of the present invention into a plurality of files, and by downloading the files from different home pages. That is, a WWW server which causes a plurality of users to download a program file which is used to implement the functional process of the present invention on a computer may also fall within the scope of the present invention.

The supply of the computer program according to the present invention may also be implemented by delivering the program which has been encoded and stored in a storage medium such as an FD, causing a user who meets predetermined conditions to download key information for decoding the encoded data from a home page over the Internet, and by executing the encoded program using the key information and installing it in a computer.

As many apparently widely different embodiments of the present invention can be made without departing from the spirit and scope thereof, it is to be understood that the invention is not limited to the specific embodiments thereof except as defined in the appended claims.

According to the present invention, therefore, a receiving apparatus comprising a tuner for receiving multiplexed television broadcasts receives data regarding a printer driver which is transmitted with television broadcasts, and automatically saves the printer driver in a memory for use so that the printer driver which controls a user-usable printer can be automatically upgraded.

Furthermore, a printer connected to a receiving apparatus including a tuner is automatically recognized, and a printer driver which controls that printer is determined to automatically download the printer driver which is transmitted with television broadcasts, thereby allowing a viewer or a user to download the printer driver correctly without determination of the printer type.

Furthermore, a receiving apparatus including a tuner determines the download time for a printer driver, and informs a user of that time to prevent the user from receiving another television broadcast during that time.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A television broadcast receiving apparatus for receiving a television broadcast, comprising:

setup means for setting download information for a printer driver to be retrieved;

retrieving means for retrieving a printer driver file which is specified by the download information which is set by said setup means with the television broadcast;

installation-executing means for executing an installation operation to install the printer driver file retrieved by said retrieving means into storage so as to be executable; and receiving means for receiving download guide information including printer driver information and download time information, wherein said setup means sets the download information by determining a download time for the printer driver to be retrieved according to the download guide information received by said receiving means.

2. An apparatus according to claim 1, further comprising determining means for determining a printer type of a printer connected via an interactive interface, wherein said setup means sets the download information by determining the printer driver to be retrieved according to the printer type determined by said determining means.

3. An apparatus according to claim 2, wherein the interactive interface is an IEEE 1394 interface, of which a plug-and-play capability is used to determine the printer type of the connected printer.

4. An apparatus according to claim 1, wherein the printer driver file is an executable format file, and said installation-executing means executes the printer driver file which is an executable format file, to execute the installation operation automatically.

5. An apparatus according to claim 1, wherein said receiving means receives the download guide information together with electronic program guide information.

6. An apparatus according to claim 1, further comprising counting means for counting time, wherein said retrieving means retrieves the printer driver when the time counted by said counting means reaches the download time set by said setup means.

7. An apparatus according to claim 1, further comprising a display device for displaying the download time and a channel when the download information is registered by said setup means.

8. An apparatus according to claim 1, wherein said retrieving means causes the television broadcast receiving apparatus to shift from standby mode to television broadcast reception mode when said retrieving means starts receiving the printer driver file, and to shift from television broadcast reception mode to standby mode when said retrieving means finishes retrieving the printer driver.

9. A television broadcast receiving method of receiving a television broadcast, comprising the steps of:

setting download information for a printer driver to be retrieved;

retrieving a printer driver file which is specified by the set download information with the television broadcast;

executing an installation operation to install the retrieved printer driver file into storage so as to be executable; and receiving download guide information including printer driver information and download time information, wherein said setting step includes setting the download information by determining a download time for the printer driver to be retrieved according to the received download guide information.

10. A method according to claim 9, further comprising the step of determining a printer type of a printer connected via an interactive interface,
wherein said setting step includes setting the download information by determining the printer driver to be retrieved according to the printer type determined in said determining step.

11. A method according to claim 10, wherein the interactive interface is an IEEE 1394 interface, of which a plug-and-play capability is used to determine the printer type of the connected printer.

12. A method according to claim 9, wherein the printer driver file is an executable format file, and said step of executing an installation operation includes executing the printer driver file which is an executable format file, to execute the installation operation automatically.

13. A method according to claim 9, wherein said receiving step includes receiving the download guide information together with electronic program guide information.

14. A method according to claim 9, further comprising the step of counting time,
wherein said retrieving step includes retrieving the printer driver when the time counted in said counting step reaches the download time set in said setting step.

15. A method according to claim 9, wherein, when the download information is registered in said setting step, the download time and a channel are displayed on a display device.

16. A method according to claim 9, wherein said retrieving step includes causing a television broadcast receiving apparatus to shift from standby mode to television broadcast reception mode when the retrieving operation of the printer driver starts, and to shift from television broadcast reception mode to standby mode when the retrieving operation of the printer driver ends.

17. A computer readable medium storing a computer program executed on a television broadcast receiving apparatus which receives a television broadcast, said computer program causing the television broadcast receiving apparatus to execute the steps of:
setting download information for a printer driver to be retrieved;
retrieving a printer driver file which is specified by the set download information with the television broadcast;
executing an installation operation to install the retrieved printer driver file into storage so as to be executable; and
receiving download guide information including printer driver information and download time information,
wherein said setting step includes setting the download information by determining a download time for the printer driver to be retrieved according to the received download guide information.

18. A computer readable medium according to claim 17, wherein said computer program further causes the television broadcast receiving apparatus to execute the step of determining a printer type of a printer connected via an interactive interface,
wherein said setting step includes setting the download information by determining the printer driver to be retrieved according to the printer type determined in said determining step.

19. A computer readable medium according to claim 17, wherein the printer driver file is an executable format file, and said step of executing an installation operation includes executing the printer driver file which is an executable format file, to execute the installation operation automatically.

20. A computer readable medium according to claim 17, wherein said receiving step includes receiving the download guide information together with electronic program guide information.

21. A computer readable medium according to claim 17, wherein said computer program further causes the television broadcast receiving apparatus to execute the step of counting time,
wherein said retrieving step includes retrieving the printer driver when the time counted in said counting step reaches the download time set in said setting step.

22. A computer readable medium according to claim 17, wherein, when the download information is registered in said setting step, the download time and a channel are displayed on a display device.

23. A computer readable medium according to claim 17, wherein said retrieving step includes causing the television broadcast receiving apparatus to shift from standby mode to television broadcast reception mode when the retrieving operation of the printer driver starts, and to shift from television broadcast reception mode to standby mode when the retrieving operation of the printer driver ends.

* * * * *